US009675009B1

(12) United States Patent
Stirewalt

(10) Patent No.: US 9,675,009 B1
(45) Date of Patent: Jun. 13, 2017

(54) CONVERTIBLE, DUAL MODE HAY FEEDER

(71) Applicant: Daniel Stirewalt, Prineville, OR (US)

(72) Inventor: Daniel Stirewalt, Prineville, OR (US)

( * ) Notice: Subject to any disclaimer, the term of this patent is extended or adjusted under 35 U.S.C. 154(b) by 0 days.

(21) Appl. No.: 15/264,100

(22) Filed: Sep. 13, 2016

Related U.S. Application Data

(63) Continuation-in-part of application No. 15/084,124, filed on Mar. 29, 2016.

(51) Int. Cl.
*A01D 90/10* (2006.01)
*A01F 29/01* (2006.01)
*A01K 5/00* (2006.01)
*A01F 29/00* (2006.01)

(52) U.S. Cl.
CPC ............ *A01F 29/01* (2013.01); *A01F 29/005* (2013.01); *A01K 5/001* (2013.01); *Y10S 241/605* (2013.01)

(58) Field of Classification Search
CPC .... A01D 90/10; A01D 90/105; A01D 87/126; Y10S 241/605; Y10S 83/909; A01F 29/005; A01K 5/00; A01K 5/001; B65B 69/0025; Y10T 29/49821; Y10T 29/5139
USPC .......... 241/101.76, 280, 605; 414/111, 24.5, 414/24.6, 25, 412, 509, 518
See application file for complete search history.

(56) References Cited

U.S. PATENT DOCUMENTS

| | | | | |
|---|---|---|---|---|
| 3,322,256 A | * | 5/1967 | Roach | B65G 47/24 198/406 |
| 3,385,336 A | * | 5/1968 | Barnard | A01F 29/02 83/257 |
| 4,929,141 A | * | 5/1990 | Keesey | B65B 69/0033 414/412 |
| 5,209,413 A | * | 5/1993 | Dwyer | A01F 29/005 241/101.76 |
| 5,333,799 A | * | 8/1994 | Posthumus | A01F 25/2036 241/101.75 |
| 5,997,233 A | * | 12/1999 | Whatley | A01D 90/10 414/25 |
| 6,044,738 A | * | 4/2000 | Hawley | B65B 69/0025 241/605 |
| 6,116,838 A | * | 9/2000 | Whatley | A01D 90/10 414/25 |
| 6,171,047 B1 | * | 1/2001 | Vandervalk | A01D 87/126 414/111 |
| 6,695,560 B2 | * | 2/2004 | Maclay | A01D 87/126 241/101.4 |
| 6,769,981 B1 | * | 8/2004 | Perrault | A01D 46/02 460/123 |
| 6,986,233 B1 | * | 1/2006 | Covington | B65B 69/0025 29/426.4 |
| 7,721,984 B2 | * | 5/2010 | Bootsma | A01D 90/10 241/101.76 |
| 8,192,130 B2 | * | 6/2012 | Clark | A01D 87/126 241/101.76 |

(Continued)

*Primary Examiner* — Gregory Adams
(74) *Attorney, Agent, or Firm* — Mark S Hubert

(57) ABSTRACT

A convertible hay bale flaking device that accommodates two bales of hay and is operated via a remote control. The functions of the device allow the controlled translation of a bale of hay stored at the rear of the device along the linear axis of the device onto a front ramp where it can be advanced perpendicularly to the linear axis of the device such that it can pass over and extend beyond the side edge of the device. When in this position, it can either be segregated into flakes by gravity or via a cutting blade forcefully disposed downward into the hay bale.

7 Claims, 14 Drawing Sheets

(56) References Cited

U.S. PATENT DOCUMENTS 8,696,290 B2 * 4/2014 Shoemaker .......... A01D 90/083
414/111

* cited by examiner

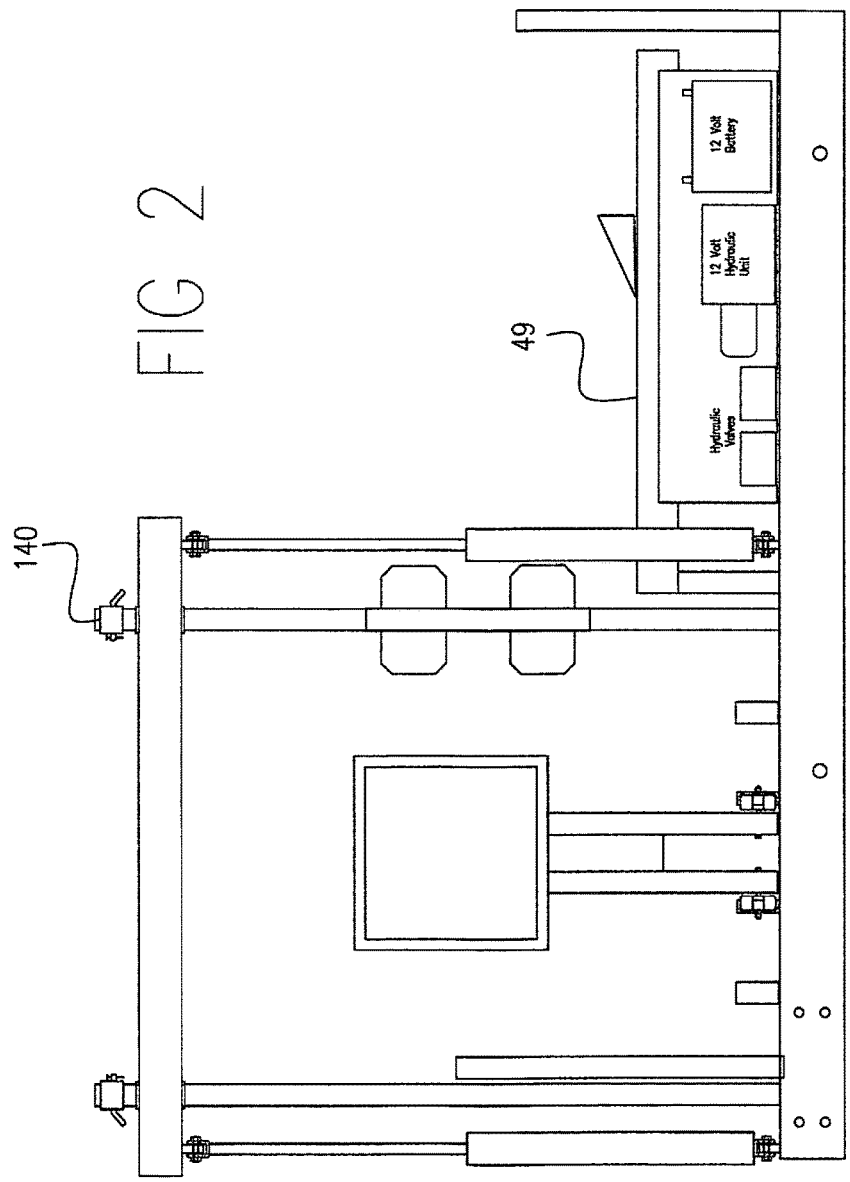

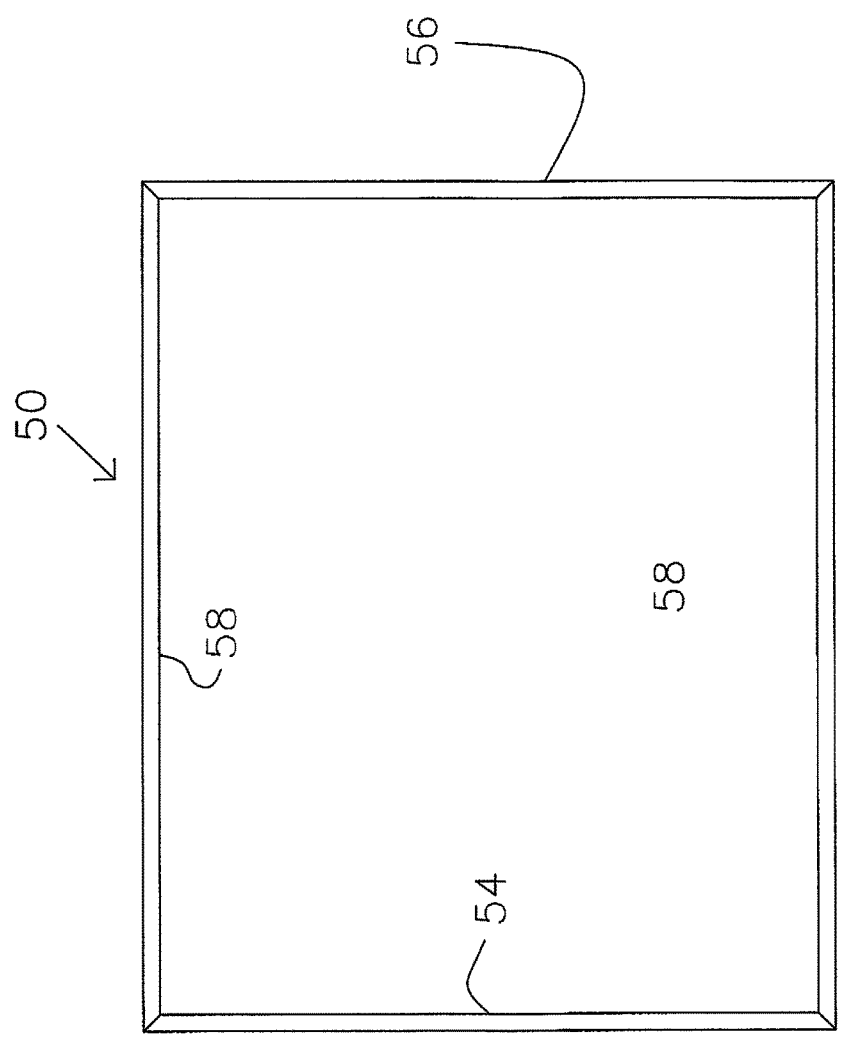

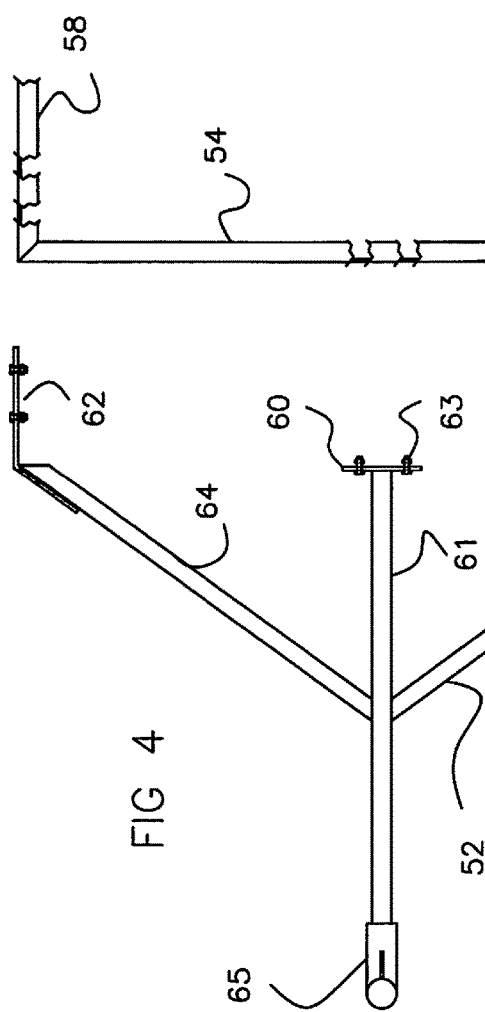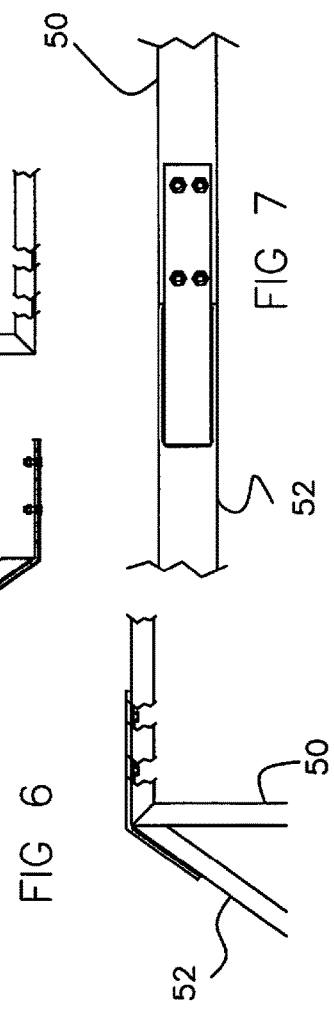

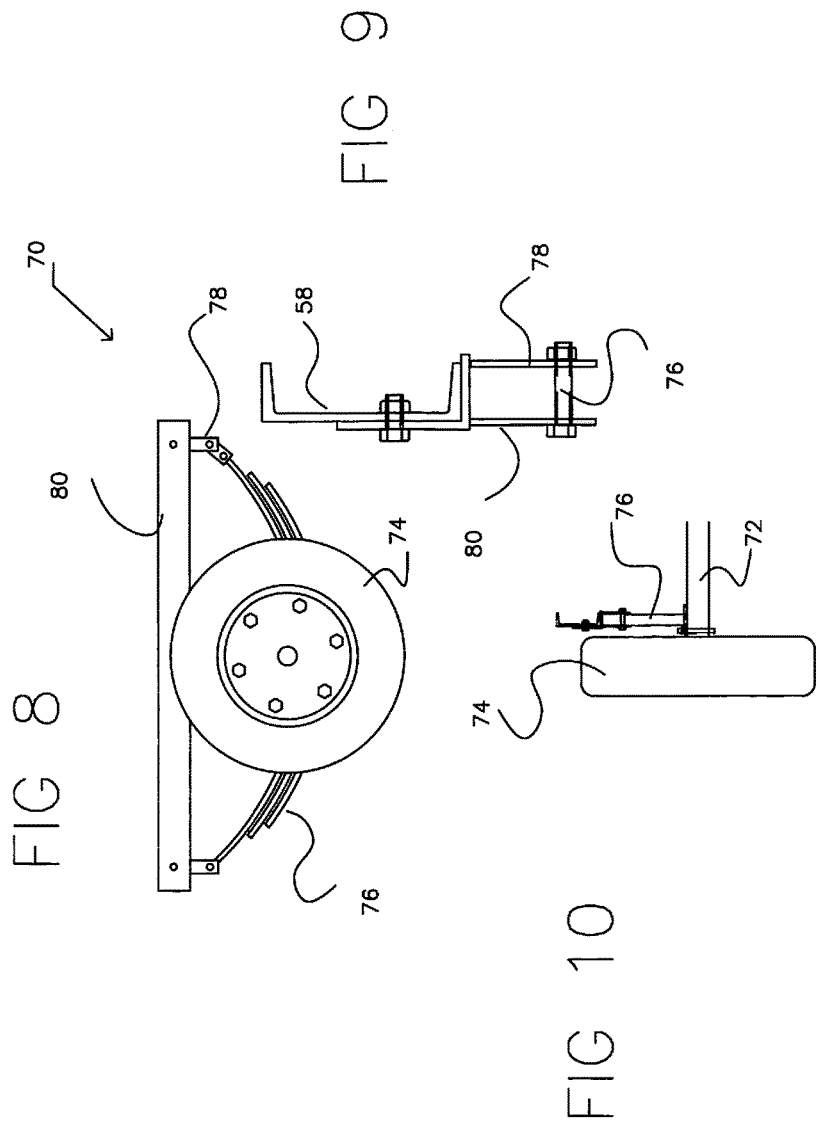

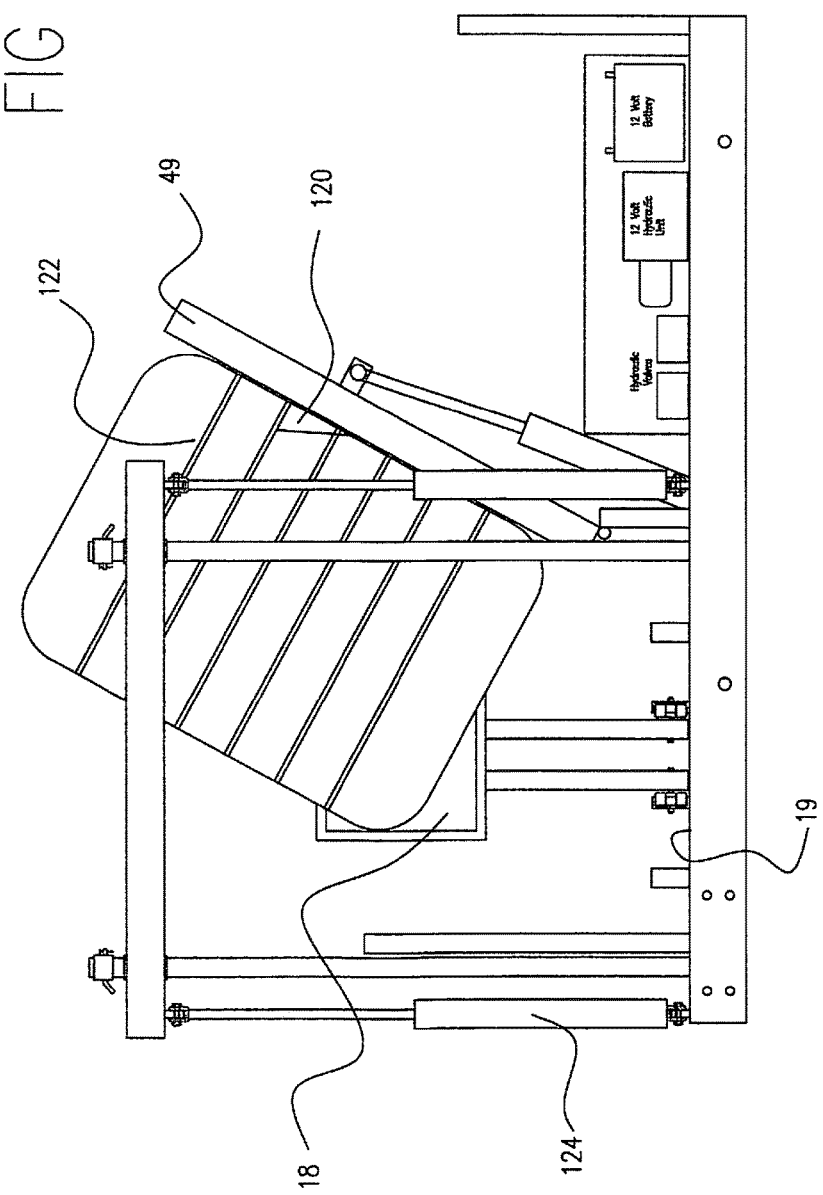

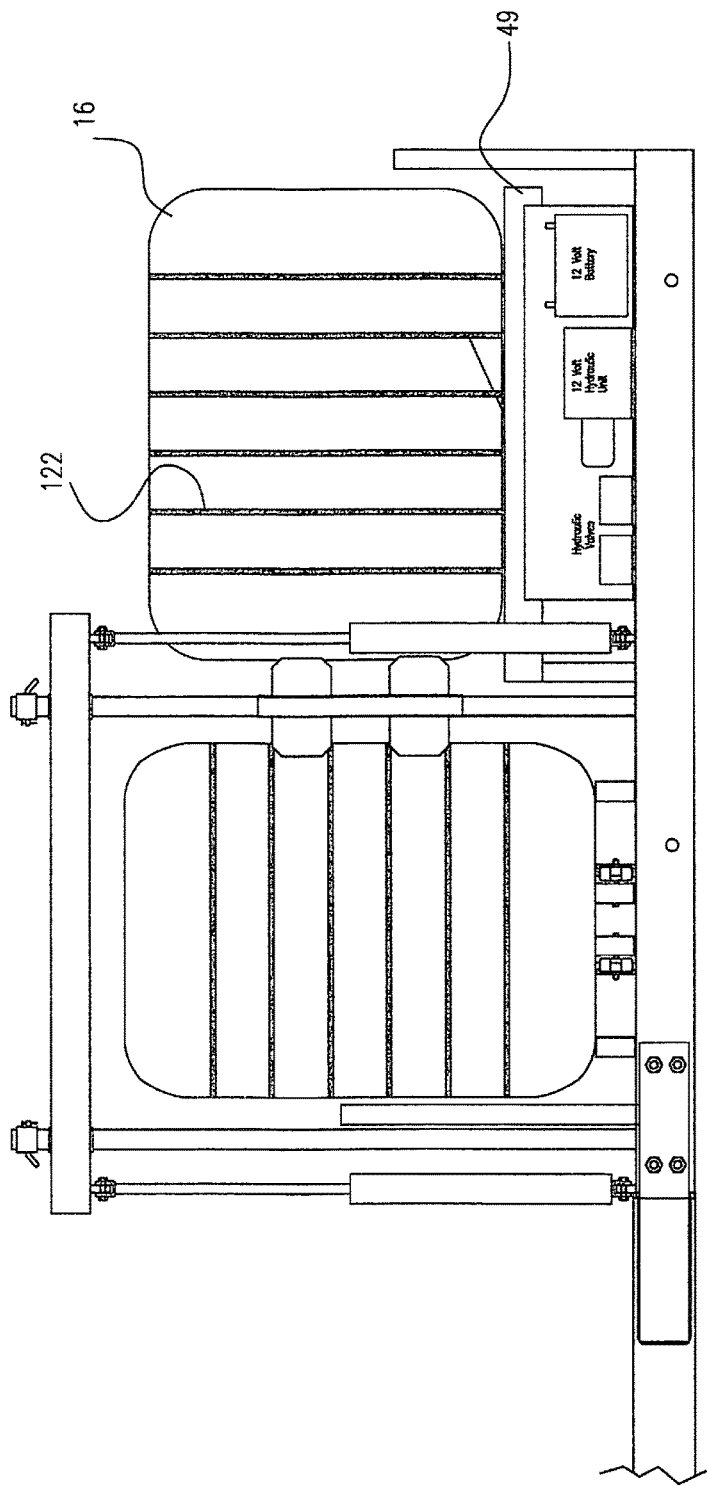

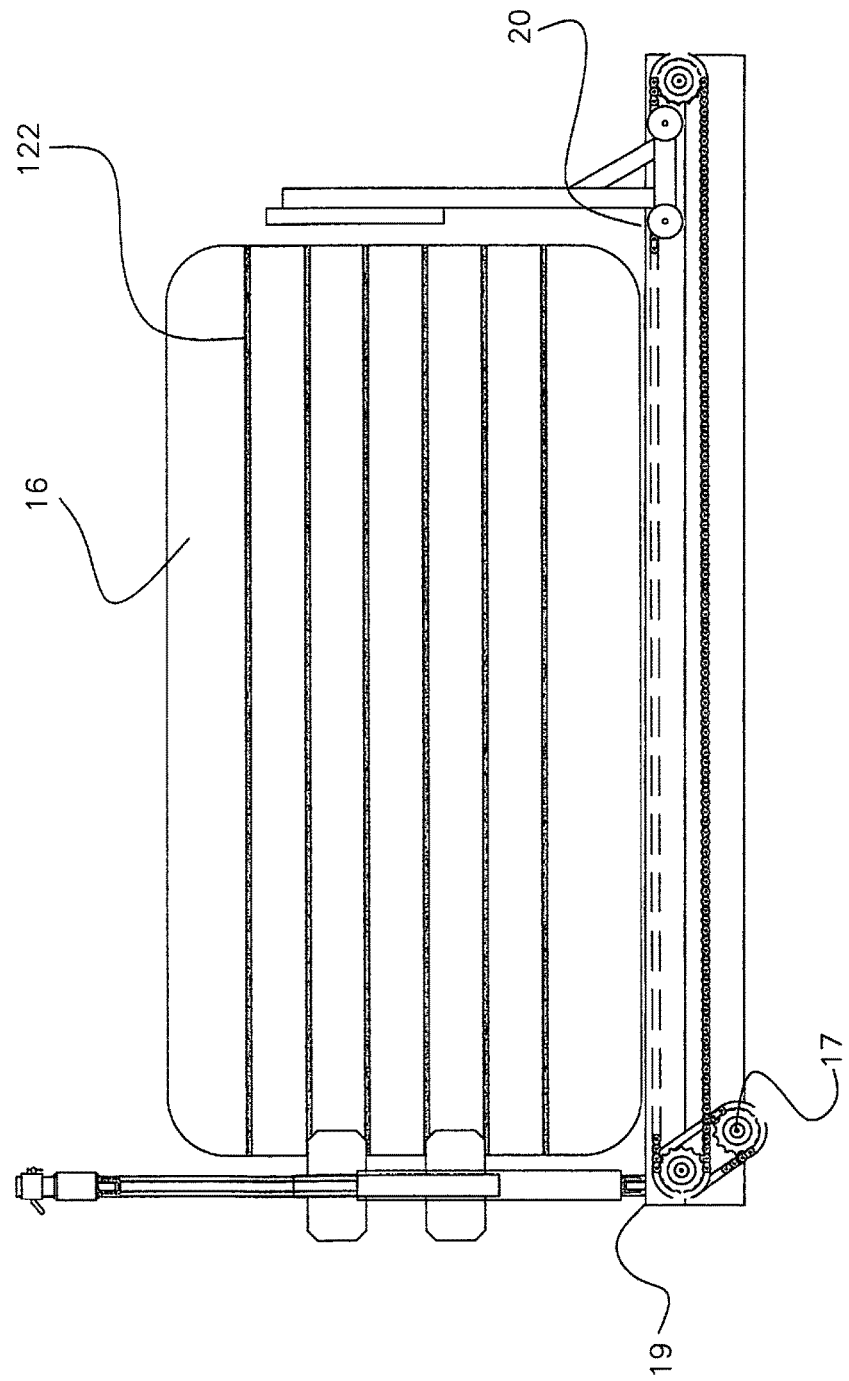

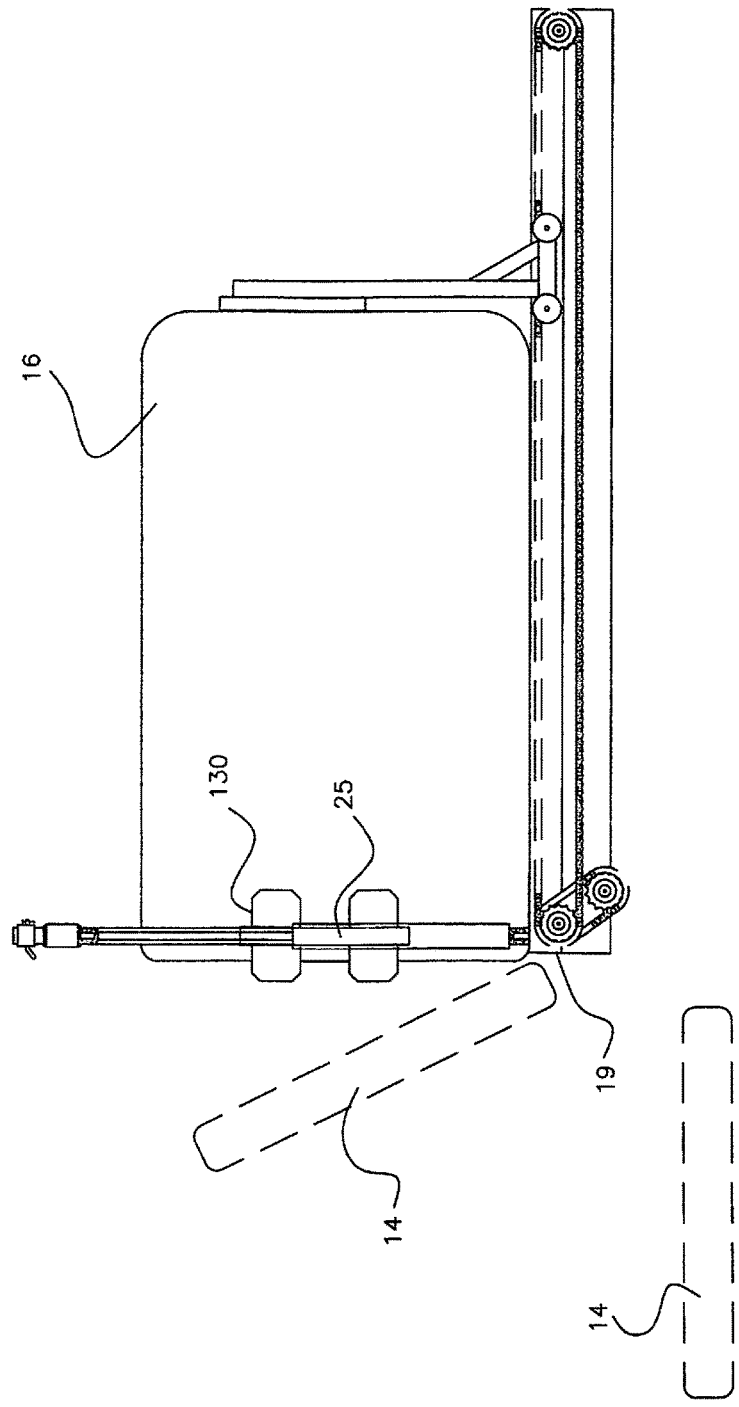

CONVERTIBLE, DUAL MODE HAY FEEDER

PRIOR APPLICATIONS

This application incorporates by reference herein and is a continuation in part of earlier filed U.S. utility Patent Application entitled "HAY BALE SHREDDER FOR FEEDING LIVESTOCK" Ser. No. 15/084,124, filed Mar. 29, 2016.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to farm equipment, and more particularly to a dual disbursement mode device, towable by or mounted to a vehicle for the feeding of baled grains, grasses and the like, to small herds of livestock.

BACKGROUND

Economics and the rising cost of land has condensed the size of many farms. The raising of livestock, particularly cows, is done in a density far beyond the numbers of cattle that the land's vegetation can naturally feed. Since grazing cattle will eat all day on fertile ground, this necessitates generally one to two feedings a day from a farmer raising cattle on barren or less fertile ground. This can be a sizeable task. A herd of 25 to 75 cows will require approximately two mid size, (1000 lbs) six string bales of hay per feeding (daily).

With the advent of modern farm machinery, hay is baled into larger, more dense industry standardized blocks. The standard midsize bale weighs approximately 1000 lbs. For extremely small farms it is possible for the farmer to pitch the hay with a pitchfork off the back of a pickup truck or to segment the standard bales into smaller bales and throw them off the truck. However, when dealing with small herds this is not practical because it requires more than one person. Transporting and segmenting these about the farmyard requires specialized equipment often beyond the budget of the small herd farmer and better suited for large herds.

The various feedstock for cattle ranges in density from from alfalfa, hay and grass hay. Additionally, if the feedstock is kept uncovered outside, it may be wet on its top or possibly, partially frozen. This density has a profound effect on how the bale can be segregated into flakes.

Henceforth, a small profile hay feeder that can be utilized in conjunction with existing farm equipment and can house enough grain, grass or the like for a single feeding of a small herd, and is capable of segmenting and distributing the various density feedstocks about a farmyard, would fulfill a long felt need of the small farmer. This new invention utilizes and combines known and new technologies in a unique and novel configuration to overcome the aforementioned problems and accomplish this.

BRIEF SUMMARY

In accordance with various embodiments, a small profile hay feeder that can be quickly converted between a unit to be towed behind a pickup truck or transported about on the bed of a flatbed pickup truck is provided.

In one aspect, a hay feeder capable of transporting enough feedstock to feed a small farm of 25-75 head of cattle is a single trip is provided.

In another aspect, a hay feeder capable of multiple modes of flake disbursement to accommodate the various densities of feedstock is provided.

In yet another aspect, a hay feeder capable of housing multiple bales and moving them about the hay feeder while maintaining the proper orientation for automated flake disbursement is provided.

In yet another aspect, a hay feeder operable by a single person, and having a simple four button remote control capable of remotely positioning a bale, moving a bale and segmenting flakes from a bale is provided.

In another aspect, dual mode, convertible hay bale flaking device that accommodates two bales of hay and is operated via a remote control that allows the controlled translation of a bale of hay stored at the rear of the device along the linear axis of the device onto a front ramp where it can be advanced perpendicularly to the linear axis of the device such that it can pass over and extend beyond the side edge of the device where it can either be segregated into flakes by gravity or via a cutting blade forcefully disposed downward into the hay bale.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components

FIG. 2 is a side view of the hay feeder in the flatbed configuration, with the tilt table lowered and horizontal;

FIG. 3 is a top view of the base frame;

FIG. 4 is a top view of the tongue assembly;

FIG. 5 is a partial top view of the base frame showing the attachment points;

FIG. 6 is a partial top corner view of the base frame connected to the tongue assembly;

FIG. 7 is a partial side corner view of the base frame connected to the tongue assembly;

FIG. 8 is a side view of the axle assembly;

FIG. 9 is a cross sectional end view of the spring suspension bracket attachment;

FIG. 10 is a cross sectional end view of one side of the axle assembly;

FIGS. 17-20 are sequential side and rear views of the hay feeder through the loading and feeding phases.

DETAILED DESCRIPTION OF CERTAIN EMBODIMENTS

Figure 1:
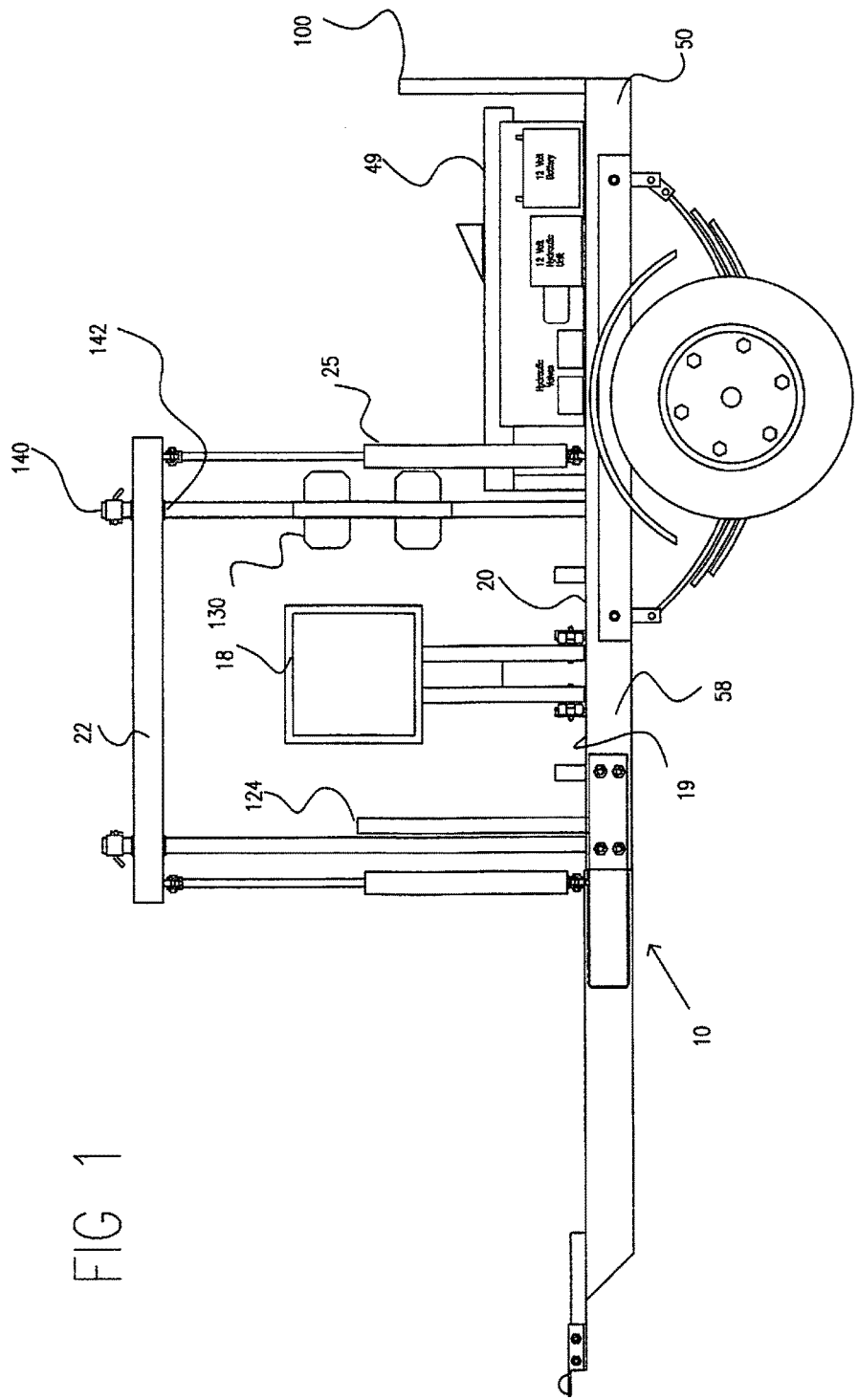
FIG. 1 is a side view of the hay feeder in the trailer configuration, with the tilt table lowered and horizontal.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation. What is referred to as the linear axis of the base or linear axis of the device, runs from the front member of the frame toward the rear member of the base along the midline of the device, generally parallel to the side members, where the base is rectangular.

The term "hydraulic unit" as used herein, refers to an operative combination of mechanical components that can produce a pressurized flow of hydraulic fluid generally that circulates from and to a hydraulic fluid reservoir. Such a hydraulic unit commonly includes an operatively connected hydraulic fluid reservoir, hydraulic valves, and a hydraulic pump driven by an electric motor. A mechanical device is connected to the hydraulic unit and uses the flow of hydraulic fluid to accomplish work.

The term "means for bale horizontal feed alignment", "bale constraining means" and "means for sectioning" as used herein including the claims, is to be interpreted according to 35 USC 112 [para] 6.

As used herein the term "feedstock" refers to any of the organic material used to feed livestock, primarily cows, and that is formed into bales. It is interchangeably used with the term "bales".

The present invention relates to a novel design for a convertible, dual mode hay feeder ("device 10") for the disbursement of hay bales into smaller flake units from or behind a driven vehicle. The device 10 has a three-part frame that is convertible between a flatbed configuration and a trailer configuration. The flatbed configuration has a planar base frame 50 that may be removeably strapped or mounted atop of a truck's flatbed. (FIG. 2) The trailer configuration mechanically connects a tongue assembly 52 and an axle assembly 70 to the base frame to form a trailer, which is towable behind a truck. Regardless of the device's configuration it may be operated by a single farmer from the cab of the driving vehicle via a four button remote control 31.

Figure 12:
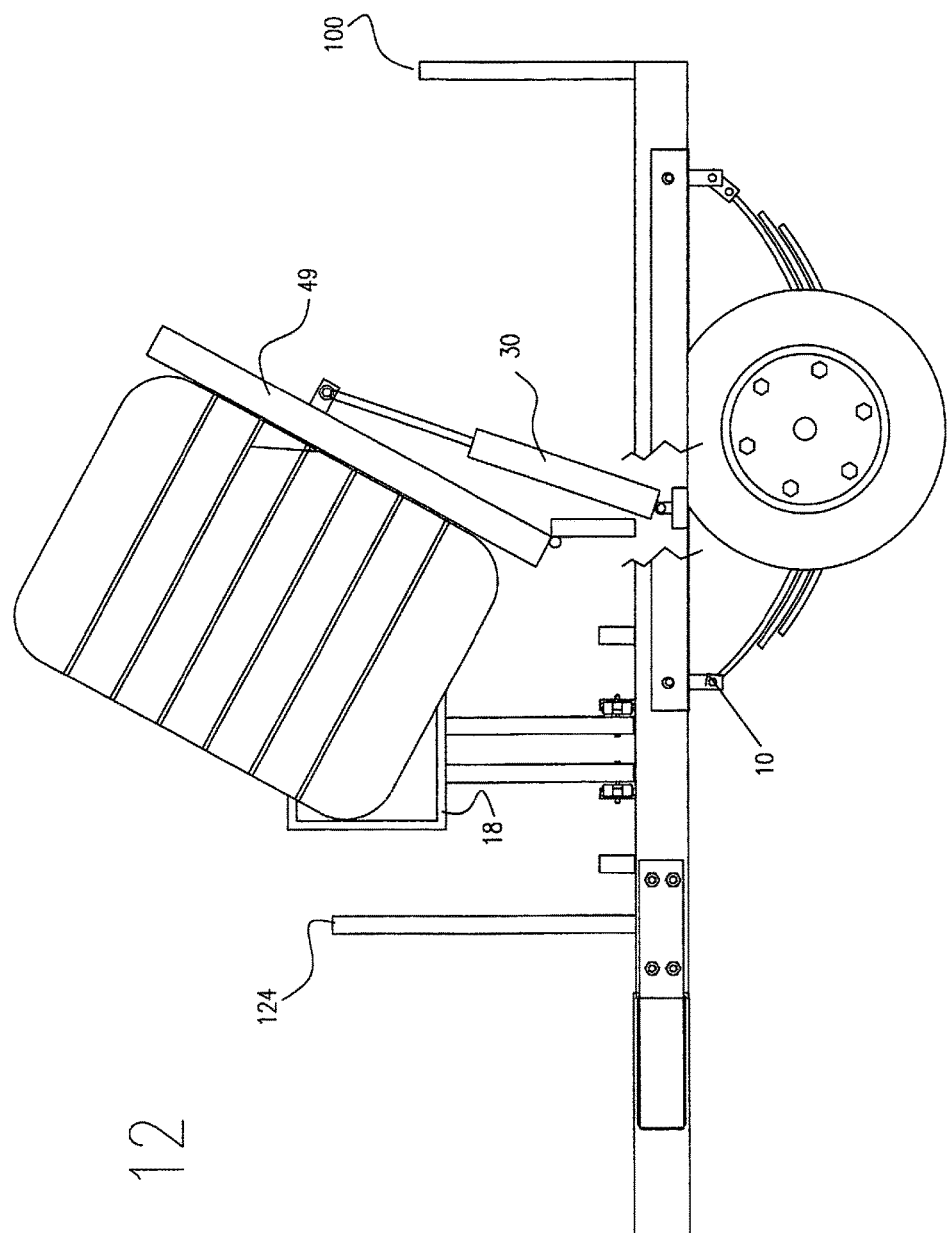
FIG. 12 is a side view of the hay feeder (trailer configuration) with the hydraulics removed for visual clarity, and the ram retracted.

FIG. 12 shows a stripped down view of the trailer configuration of the device 10. The power unit and hydraulics as well as the stanchions and sectioning means have been removed for visual clarity as many of the components are visually obscured in the side views. Here the mounting and pivot points of the tilt table can be seen, as well as the location of the front wall 124.

The function and operation of the hay feeder 10 can best be described with reference to FIGS. 17-20. The hay bale 16 in its strapped form is loaded onto the tilt table assembly at the rear of the device 10. (The tilt table assembly is made of the tilt table 49 operatively coupled to a lift cylinder 30 pivotally anchored onto the base frame 50.) The bale constraining means 120 engages the bale 16 and its strapping 122. The diverter valve 108 is selected for tilt table operation. Pivotable lift cylinder 30 is extended so as to vertically tilt the tilt table 49 so as to slide the bale 16 onto the ramp 20 at the front of the device 10. (FIG. 17) As the bale 16 slides down the tilt table 49 the bale constraining means 120 ensures that the bale 16 stays on the tilt table 49 until the bale 16 is resting on the ramp 20 and does not tumble off the tilt table 49 or wedge sideways or angular in the area between the ramp 20 and the tilt table 49 as it comes onto the ramp 20. When it reaches the ramp 20 its momentum carries it forward until it contacts the front wall 124 keeping it between the front wall 124 and the base of the tilt table 49. (FIG. 19) The lift cylinder 30 is retracted until the tilt table 49 again resides in a horizontal position. A second bale 16 is loaded onto the tilt table 49 and the diverter valve is selected for ram operation. (FIG. 18) The farmer cuts the straps 122 off of the bale 16. The chain drive 17 is rotationally driven so as to pull the chain and advance the ram 18 along the ramp 20 contacting the end of the bale 16 and pushing the bale 16 along the ramp 20. The side of the bale contacts the means for horizontal bale alignment 130 which straightens the bale 16 along the ramp 20 pushing it even along the front wall 124 so as to align it perpendicularly with the dispensing end 19 of the ramp. (FIG. 18) The bale 16 is continually driven toward the dispensing end 19, between the two sectioning hydraulic cylinders 25 and under the sectioning blade 22, until a section of sufficient thickness of the bale 16 extends beyond the dispensing end. At this juncture there are two different mechanisms to section a flake 14 from the bale 16. These are based on the density, type and condition of bale. Wet, frozen or dense material requires more force to section off a flake 14. Here a pair of sectioning hydraulic cylinders 25 are retracted to pull a sectioning blade 22 down onto the top of the bale approximately even with the edge of the dispensing end. (The sectioning blade 22 does not continue through the bale 16, but rather, gently imparts a downward force that is transmitted through the compressing bale and onto the edge of the dispensing end 19 so as to sheer off a flake 14 which tumbles forward under the advancing bale 16 and off the hay feeder onto the ground. The sectioning cylinders 25 are extended and the process is repeated onto the advancing bale 16. If the hay is less dense, not wet or frozen there is no need to use a sectioning blade 22 as the flakes 14 will separate from the bale as they advance off of the ramp 20 due to the lack of bottom support. After the entire bale 16 has been sectioned and disbursed, the chain drive 17 is rotationally reversed and driven so as to pull the chain and retract the ram 18 along the ramp 20 back to its original position. The device is now ready to repeat the cycle. There is no difference in the operation of the trailer configuration or the flatbed configuration of the hay feeder other than the fact that one is pulled behind the truck and the other is carried on the back of the truck.

Looking at FIG. 3 the planar base frame 50 is illustrated. It is a rectangular steel frame having a proximal front member 54 with a parallel rear, distal member 56 and two parallel side members 58 that hold the front and rear members in a parallel spacing. It is mechanically connected at its corners preferably by welding, bolting, riveting or the like. Its four members will be fabricated from structural steel such as angled steel, I beam, wide flange, box tubing, channel iron or the like. In the preferred embodiment it will be fabricated from channel steel members. The side members 58 each have a series of through orifices for mechanical connection to the tongue assembly 52 and the axle assembly 70.

Looking at FIGS. 4-7 it can be seen that the tongue assembly 52 has three linear, tubular steel members, although other structural steel members may be substituted. The central brace member 61 has a proximal end with a hitch coupling 65 operatively affixed thereto and a distal end with a connection flange 60 extending perpendicularly therefrom. Between the distal and proximal ends of the central brace member 61 there are two angled side arms 64. At the distal ends of each of the side arms 64 are connection plates 62. Approximately midpoint of the proximal, front member 54 of the base frame 50 is an first array of through orifices that align with a complimentary second array of through orifices formed on the flange 60 of the center brace 61 of the tongue assembly so as to allow for the passage of appropriate mechanical fasteners 63 for coupling. Adjacent the proximal ends of the two side members 58 are third arrays of through orifices that align with complimentary fourth arrays of through orifices formed on the two connection plates 62 on the angled side arms 64, again so as to allow for the passage of appropriate mechanical fasteners 63 for coupling.

The axle assembly 70 is best illustrated with reference to FIGS. 8-10. Here it can be seen that the axle assembly 70 has an axle 72 operatively connected to a rotational wheel 74 as is well known in the art, as well as a suspension means 76 (such as a leaf spring) operatively connected at each of its ends by common suspension mounting brackets 78 to the opposite ends of a mounting plate 80. (Torsion axles may be substituted as is well known in the art.) The mounting plate 80 is mechanically coupled to each of the side members 58 of the base frame 50 by a series of mechanical fasteners passing through complimentary orifices in both the mounting plate 80 and the side members 58. The mounting plate 80 is preferably made from angle steel and the side members 58 are preferably made from channel steel. In this way (as is illustrated in FIG. 9) the inside surface of the mounting plate 80 can nestle atop of the bottom edge of the side members for ease of alignment. Although the preferred method of attachment between the tongue assembly 52, the axle assembly 70 and the base frame 50 is by bolting, there is a plethora of equivalent methods of connection including pins, devises, latches and bayonet fittings to list a few.

Figure 11:
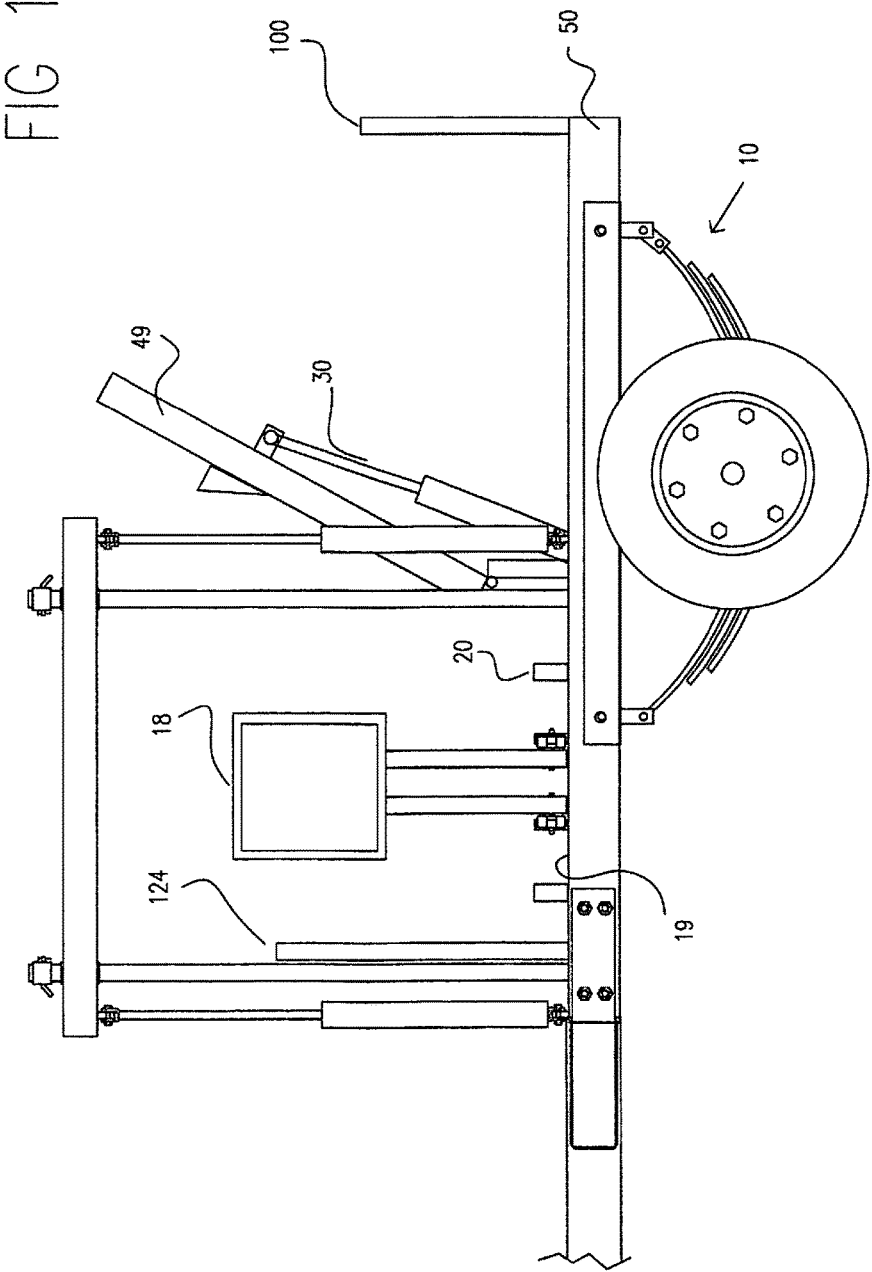
FIG. 11 is a side view of the hay feeder (trailer configuration) with the tilt table partially raised.

FIG. 1 illustrates the hay feeder 10 (trailer configuration) with the lift cylinder 30 retracted and the tilt table 49 in a horizontal position. FIG. 11 illustrates the hay feeder 10 (trailer configuration) with the lift cylinder 30 extended and the tilt table 49 in an angled position. (The means for horizontal bale alignment 130 is not illustrated in either of these illustrations.) The hay feeder 10 is built on a generally rectangular, planar base frame 50 of channel steel. At the proximal and distal ends of the frame 50 are front wall 124 and rear wall 100. These extend vertically from the base frame 50 and serve to constrain the hay bales 16 on the hay feeder 10 amidst the jostling of the hay feeder 10 as it is moved about the field. A flat ramp section 20 is provided on the base 50 having a front dispensing edge 19 along one of the side members 58 that resides perpendicular to the front wall 124 of the base frame 50. At the rear of the ramp section 20 is a moveable ram 18 that extends normally from and runs along a set of rails that lie below the surface of the ramp 20. The ram can be translated in either direction across the length of the ramp 20 (perpendicular to the linear axis of the device) by a chain drive 17 that is rotationally driven by the hydraulic unit 27 so as to pull a continuous looped chain encircled between cogs on the ram 18 and the chain drive 17. (FIG. 13) It also lies below the surface of the ramp 20.

Adjacent the dispensing edge 19 is a means for sectioning. This is a mechanical means for exerting a downward vertical line of force on the top face of the bale 16 so as to induce flake sectioning of the bale 16. In the preferred embodiment the means for sectioning has a pair of parallel stanchions 140 extending normally from the frame base 50 adjacent the dispensing edge 19. In alternate embodiments only one stanchion may be utilized. About each stanchion 140 is a sleeve 142 sized for vertical sliding engagement along its top portion. Affixed between the sleeves 142 is a linear sectioning blade 22 which in the preferred embodiment is a section of steel flat bar or angle steel. (Although tubular steel may also be used.) The sectioning blade 22 extends beyond the two stanchions 140 and each of its ends are affixed to the moveable piston end of a double acting hydraulic sectioning cylinder assembly 25. Again, in an alternate embodiment only one sectioning cylinder assembly may be employed. These sectioning cylinder assemblies 25 and stanchions 140 have their base ends adjustably anchored to the ramp and base frame 50 so as to reside in a vertical orientation parallel with the two stanchions 140. In an alternate embodiment the stanchions 140 and sectioning cylinder assemblies 25 are affixed to a base plate 150 (FIG. 13) that is mechanically mountable at various positions on the ramp and base frame so as to alter the position of the sectioning blade with respect to the linear axis of the dispensing edge. The hydraulic unit 27 is operatively connected to the sectioning cylinders so as to extend or retract their pistons to urge the sectioning blade 22 up and down on the stanchions 140. The linear axis of the sectioning blade resides parallel to the linear axis of the dispensing edge 19. Vertically, the linear axes are aligned such that the linear axis of the sectioning blade 22 is approximately even with the linear axis of the dispensing edge 19. Although other positionings will function, experience has shown at this orientation, the linear force exerted on the top of the bale will cause the bale flake to buckle outward from its front face (leading edge) so as to section from the bale and tumble off the device 10.

In alternate embodiments only one stanchion 140, one sleeve 142, one sectioning cylinder assembly 25 and a sectioning blade 22 need be assembled together and operably connected to the hydraulic unit 27 and utilized to exert a downward vertical line of force on the top face of the bale 16 so as to induce flake sectioning of the bale 16.

Since with lower density, dry hay, the means for sectioning is not needed as gravity will segregate flakes from the hay bale once the bale has been advanced far enough beyond the dispensing edge 19, alternate embodiments of this device need not incorporate the means for sectioning.

Figure 15:
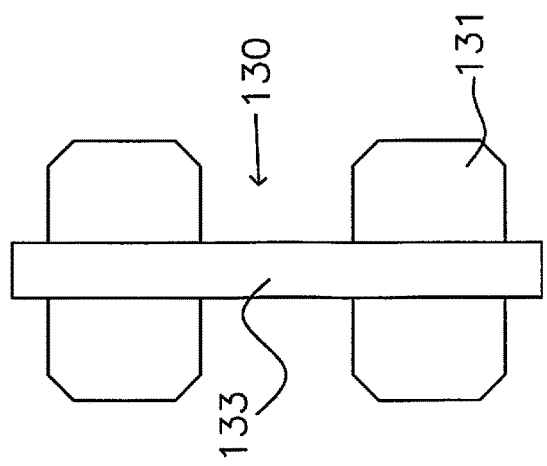
FIG. 15 is a front view of the means for horizontal bale alignment.
Figure 16:
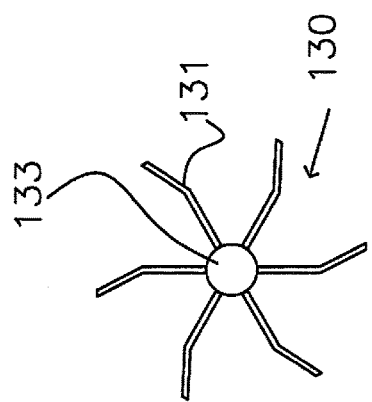
FIG. 16 is a side view of the means for horizontal bale alignment.

On the distal stanchion 140 a means for bale horizontal feed alignment 130 is affixed. In the preferred embodiment this is a set of rotational vanes 131 extending from a tube 133 that is mounted on the exterior of the distal stanchion 140, although there are a plethora of other embodiments such as spring loaded arms, defector chutes and the like that may be substituted. (FIGS. 15 and 16)

Pivotally affixed to the base frame 50 between the distal stanchion 140 and the back wall 100 is the base of a hydraulic lift cylinder 30. Its top extendable piston is pivotally connected beyond the midpoint of the tilt table 49 toward the back half of tilt table 49. The tilt table is pivotally connected at its front edge to a secondary, horizontal planar frame 151 that holds the tilt table 49 above the lift cylinder 30, such that when the piston of the lift cylinder 30 is extended, the lift table 47 pivots toward the proximal end of the device from the horizontal position to a semi vertical position. Extending normally from the upper face of the tilt table is the bale constraining means 120. In the preferred embodiment as can be seen in FIGS. 1, 2, 11, 12, 17 and 18, these are but angled rigid elbows extending normally from the tilt table 49 that are strong enough to penetrate the bale 16 between adjacent strappings (FIGS. 12, 17 and 18) so as to frictionally grip the bale and keep the bale 16 from tumbling uncontrolled down the tilt table 49 so as to wedge at an angle between the tilt table and the ramp 20. There is a plethora of equivalent mechanical devices to accomplish this task including but not limited to hooks, spikes and the like.

The power unit is located adjacent to one of the parallel side members 58 although it could also be located adjacent the proximal front member 54 or distal member 56. It the preferred embodiment it is a hydraulic unit 27 and includes an electrical source (generally a battery) to power an electric motor coupled to a hydraulic pump so as to circulate a pressurized hydraulic fluid to and from a reservoir tank. Operative connected are a set of valves and hoses to route the fluid about its path. Operative connected in this path is a mechanical device that performs work. (It is known that there are other equivalent types of hydraulic pressurizing and circulation means that may be substituted for the electric motor and pump.)

FIG. 2 illustrates the hay feeder 10 (flatbed configurations) with the lift cylinder 30 retracted and the tilt table 49 in a horizontal position.

Figure 13:
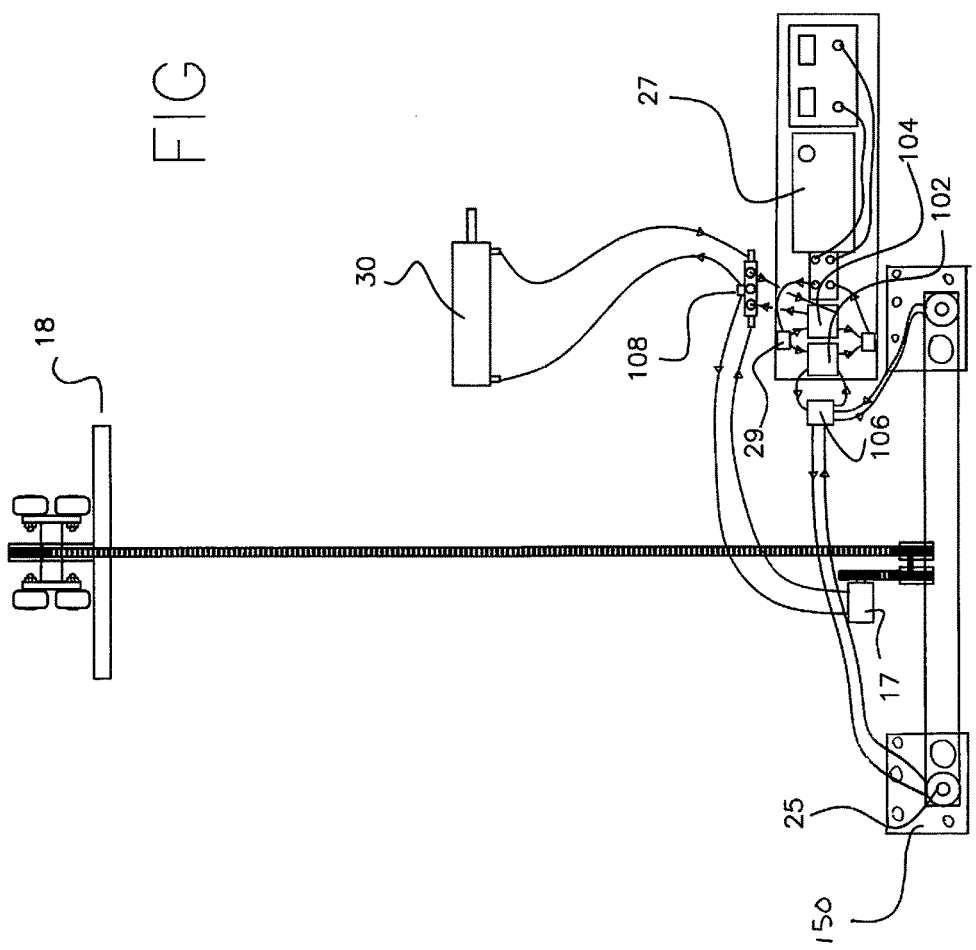
FIG. 13 is a top view of the hydraulic circuit and the chain drive.
Figure 14:
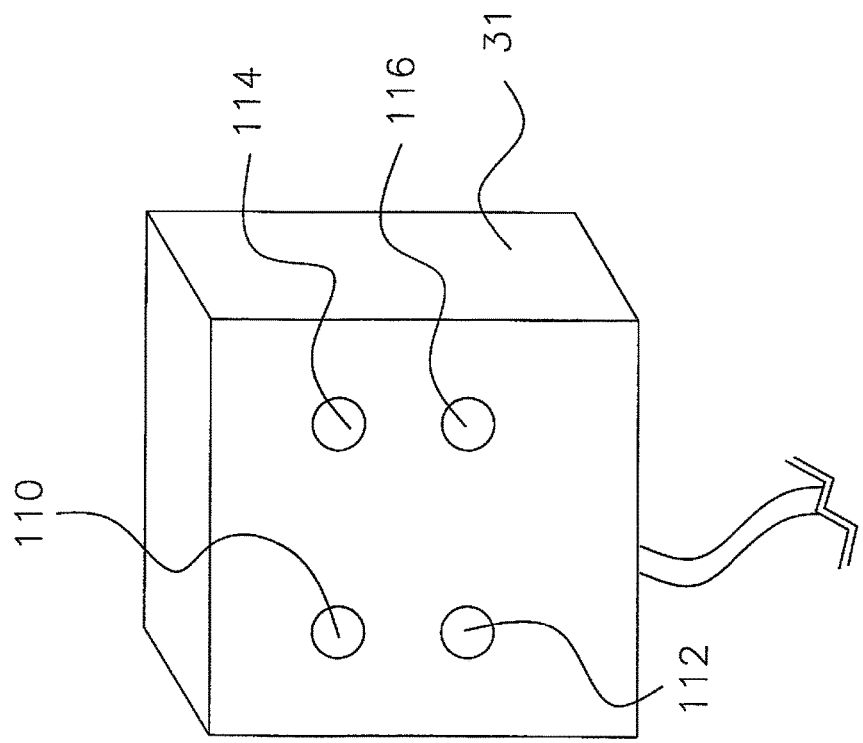
FIG. 14 is a front perspective view of the remote control.

The power unit for all of the moveable components can best be explained looking at FIGS. 13 and 14. The power for the system is fluid hydraulics with the hydraulic unit and the solenoid controls for the hydraulic vales powered by a DC battery 21 through buttons on the remote control 31. Although discussed herein as a hydraulic powered system, it is well known in the art that a pneumatic, electric or hybrid powered system could be interchangeably used. Such modifications would be well known by one skilled in the art and as such are not discussed herein although considered equivalents. The preferred embodiment utilizes a single hydraulic unit 27 to power all the system components, however it is known that multiple hydraulic units may be utilized wherein each unit would be dedicated to a single work function, such as raising the tilt table 49, moving the sectioning blade 22 and moving the ram.

The pressurized hydraulic fluid from the hydraulic unit 27 is routed to a fluid splitter block 108 which splits the fluid to go to both an electrically operated first solenoid valve 102 and second solenoid valve 104, each of which are actuated by depressing their corresponding up or down buttons (110 and 112 or 114 and 116) on the remote control 31. The up and down buttons just cross the flow direction between the inlet and outlet ports of the solenoid valve to reverse the direction of flow to the connected, working double acting hydraulic cylinders. (These solenoid valves are directional flow valves.) When these spring loaded buttons are depressed, the hydraulic unit starts and operates, providing pressurized hydraulic fluid to and through that valve to the component it is in fluid connection with. This will drive the hydraulic cylinders to extend or to retract, depending which of the directional flow buttons is depressed. When pressure is removed from the buttons, they return to their raised position, the solenoid valves will revert to a closed flow configuration and the pump will stop. (Overpressurization is controlled via a recirculation bypass valve which is well known in the art and not illustrated for visual clarity.) The return flow from each of the hydraulic work circuits fed by the first and second solenoids join in the return splitter valve to combine their flow for return to the reservoir.

First solenoid valve 102 when actuated provides fluid to a splitter block 106 which evenly divides the fluid flow and pressure between the pair of sectioning hydraulic cylinders 25 for the operation of the sectioning blade 22. (These are double acting hydraulic cylinders capable of being driven in both directions.) When the sectioning down button on the remote is depressed, the flow in the two double acting sectioning cylinders 25 causes them and the connected sectioning blade 22 to move downward. When the sectioning up button is depressed, the direction of flow to these double acting cylinders 25 is reversed and the blade 22 rises.

Second solenoid valve 104 when actuated provides the fluid flow and pressure to a manually operated diverter valve 108 that has been selected to direct the hydraulic fluid to either the hydraulic lift cylinder 30 for the tilt table 49, or the chain drive 17 for the feed ram 18. Since the chain drive 17 and the hydraulic lift cylinder 30 are used for non competing operations, they will never be operated at the same time and they may be selected manually and then operated remotely by the same two buttons. When the up/forward button is depressed the hydraulic fluid is sent to the diverter valve and through to the double acting lift cylinder 30 or reversible chain drive 17 to extend the cylinder 30 and raise the tilt table 49, or rotate the chain drive 17 so as to advance the feed ram 18 forward toward the sectioning blade 22. When the down/backward button is pressed the direction of flow to the double acting cylinder 30 is reversed and the lift cylinder 30 retracts lowering the tilt table 49, or reverses the direction of the rotation of the chain drive 17 so as to retract the feed ram 18.

FIGS. 17-20 depict the four stages of the hay feeding process. They are: loading, positioning, advancing and sectioning.

While certain features and aspects have been described with respect to exemplary embodiments, one skilled in the art will recognize that numerous modifications are possible. Similarly, while certain functionality is ascribed to certain system components, unless the context dictates otherwise, this functionality can be distributed among various other system components in accordance with the several embodiments. System components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A dual mode, convertible hay feeder device, comprising:
   a generally planar base, said base having a proximal end, a distal end and a linear axis;
   a tiltable table assembly with a bale constraining means affixed thereto, said table assembly residing at said distal end of said planar base and tiltable along said linear axis of said base;
   a ramp section, said ramp section residing on said base, and said ramp section having a front dispensing edge;
   a front wall extending upward from said proximal end of said planar base;
   a bidirectional ram, moveable back and forth across said ramp section perpendicular to said linear axis of said base, driven by a chain drive that resides below said ramp section;
   a means for sectioning, said means for sectioning operatively affixed adjacent said front dispensing edge of said ramp; and
   a power unit operatively connected to said tiltable table assembly, said means for sectioning and said ram;
   a means for horizontal bale alignment extending normally from said ramp;
   and rotatably mounted on said means for sectioning;
   wherein said means for sectioning comprises at least one stanchion extending from said planar base, a sleeve slidingly engaged about said stanchion, a linear sectioning blade affixed to said sleeve, and a double acting sectioning cylinder affixed to said planar base and operative connected to said sleeve so as to impart vertical linear movement to said sleeve and said sectioning blade about said stanchion.

2. The dual mode convertible hay feeding device of claim 1 wherein said tiltable table assembly comprises a table, hingeably connected about a front edge to said base, and a lift cylinder pivotally affixed at a first end to to said base and at a second end to said table, so as to pivotally tile said table from said base about said front edge.

3. The dual mode convertible hay feeding device of claim 1 further comprising a remote control operatively connected to said power unit, said remote control capable of starting and stopping said power unit and directing the flow of pressurized fluid to said chain drive, said lift cylinder and at least one said sectioning cylinder.

4. The dual mode convertible hay feeding device of claim 1 wherein said means for sectioning is adjustably affixed to said planar base.

5. The dual mode convertible hay feeding device of claim 4 wherein said means for sectioning comprises a pair of stanchions extending from said planar base, a sleeve slidingly engaged about each of said stanchions, a linear sectioning blade affixed to said sleeves, and a pair of double acting sectioning cylinders affixed to said planar base and operative connected to said sleeves so as to impart vertical linear movement to said sleeves and said sectioning blade about said pair of stanchions.

6. A dual mode convertible hay feeding device comprising;
   a generally planar base, said base having a proximal end, a distal end and a linear axis;
   a tiltable table assembly with a bale constraining means affixed thereto, said table assembly residing at said distal end of said planar base and tiltable along said linear axis of said base;
   a ramp section, said ramp section residing on said base, and said ramp section having a front dispensing edge;
   a front wall extending upward from said proximal end of said planar base;
   a ram, moveable across said ramp section perpendicular to said linear axis of said base;
   a means for horizontal bale alignment extending normally from said ramp; and
   a power unit operatively connected to said tiltable table assembly and said ram; and
   a tongue assembly; and
   an axle assembly;
   wherein said base has a front member and a rear member held in a spaced configuration by at least two side members, said side members mechanically connectable to said axle assembly, and
   wherein said front member and said side members are each mechanically connectable to said tongue assembly;
   wherein said device is mechanically connectable to a vehicle for towing;
   wherein said device is operationally mountable onto the flatbed of a vehicle.

7. A dual mode, convertible hay feeder device, comprising:
   a generally planar base, said base having a proximal end, a distal end and a linear axis;
   a tiltable table assembly with a bale constraining means affixed thereto, said table assembly residing at said distal end of said planar base and tiltable along said linear axis of said base;
   a ramp section, said ramp section residing on said base, and said ramp section having a front dispensing edge;
   a front wall extending upward from said proximal end of said planar base;
   a ram, moveable across said ramp section perpendicular to said linear axis of said base;
   a means for sectioning;
   a means for horizontal bale alignment rotatably extending from said means for sectioning;
   a power unit operatively connected to said tiltable table assembly, said means for sectioning and said ram;
   a detachable trailer assembly made of a tongue assembly and an axle assembly;

wherein said base has a front member and a rear member held in a spaced configuration by at least two side members, said side members mechanically connectable to said axle assembly, and wherein said front member and said side members are each mechanically connectable to said tongue assembly;

wherein said device is mechanically connectable to a vehicle for towing;

wherein said device is operationally mountable onto the flatbed of a vehicle.

* * * * *